J. SATTERQUIST & N. C. NELSON.
CAKE AND BISCUIT CUTTER AND LIFTER.
APPLICATION FILED JAN. 30, 1917.
1,237,826.
Patented Aug. 21, 1917.
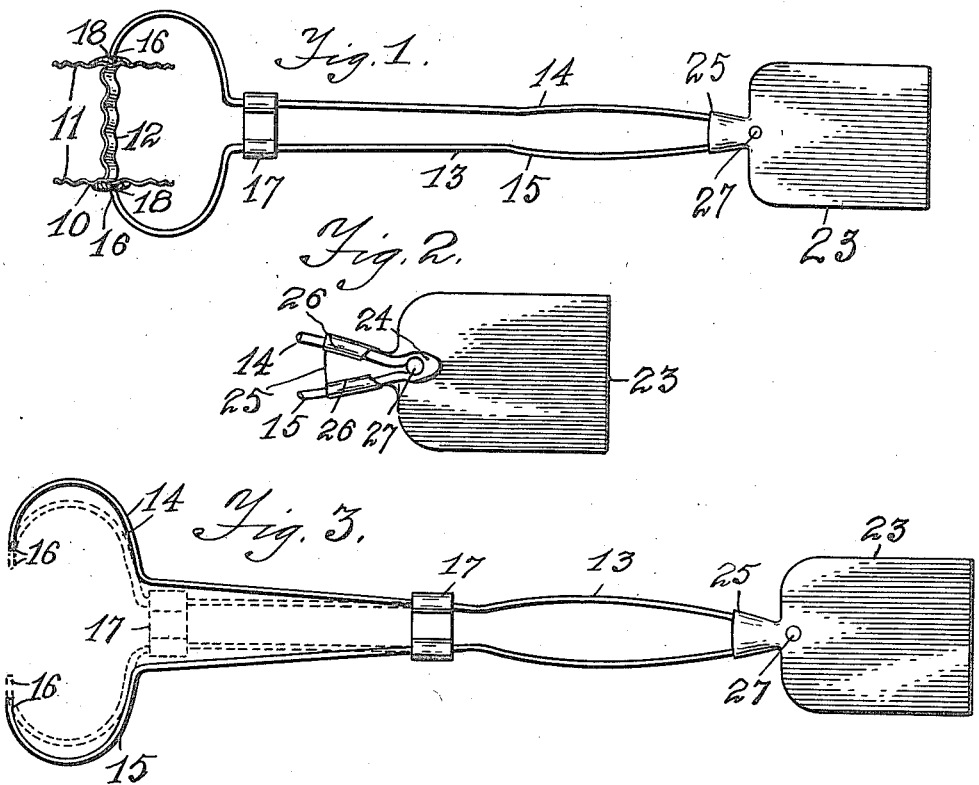

UNITED STATES PATENT OFFICE.

JOHN SATTERQUIST AND NELS CONRAD NELSON, OF JAMESTOWN, NEW YORK.

CAKE AND BISCUIT CUTTER AND LIFTER.

1,237,826.

Specification of Letters Patent.

Patented Aug. 21, 1917.

Application filed January 30, 1917. Serial No. 145,526.

*To all whom it may concern:*

Be it known that we, JOHN SATTERQUIST, a citizen of the United States, and NELS CONRAD NELSON, a subject of the King of Sweden, residing at the city of Jamestown, in the county of Chautauqua and State of New York, have invented certain new and useful Improvements in Cake and Biscuit Cutters and Lifters, of which the following, taken in connection with the accompanying drawings, is a specification.

The invention relates to cutters for cakes, biscuits and similar articles; and the improvement consists in providing a removable handle for a rotary cutter that a number of cutters of different designs may be used on the same handle, also provision being made on the opposite end of the handle from that supporting the cutter for a lifter for the cakes, biscuits and other articles after cutting in order to place them in the pan for baking; and the invention consists in the novel features and combinations hereinafter set forth and claimed.

In the drawings, Figure 1 is a plan view of the combination lifter and cutter with the cutter supported in the spring handle. Fig. 2 is a plan view of the under side of the lifter showing the preferred manner of attaching the lifter to the spring handle. Fig. 3 is a plan view of the handle without the cutter, showing in dotted outline the position of the spring forks in clasping the rotary cutter.

Like characters of reference refer to corresponding parts in the several views.

The numeral 10 designates the rotary cutter which is formed by two disks 11 which have a connecting portion, usually the crosswise cutting portion 12, between the disks 11 which cuts the ends of the cakes.

The cutter portion 10 is revolubly supported upon the handle 13 in the following manner: The handle 13 consists of two spring legs 14 and 15 which are bent near their ends in oppositely curved semi-circles so that the ends 16 are alined opposite one another a spaced distance apart. A clasp piece 17 is slidably mounted on the legs 14 and 15, said legs being so shaped as to approach toward one another near the central portion of the length thereof so that when the clasp 17 is slipped down to said central portion the legs 14 and 15 are permitted to spring apart as shown in Fig. 3. When the clasp 17 is slipped up to the semi-circular portions the two legs 14 and 15 are moved toward one another and held firmly in this clasped position.

The cutter 10 has a hole 18 in each end thereof to receive the ends 16 of the legs 14 and 15 therein and thereby revolubly support the cutter 10 on the ends 16, and room is provided within the semi-circular portions of the legs so that the cutter 10 freely revolves when rolled along a piece of dough, and the edge of the disks 11 may be pressed down through the dough thereby cutting the sides of the cake in the dough.

The dough is rolled thin for cakes and is usually sticky and mean to handle. Accordingly a cake lifter or shovel 23 is attached to the opposite end of the handle 13 and forms a convenient tool to slip under the dough cake and lift it into the pan for baking. The sharp edge of the portion 23 is also convenient for separating the scraps of dough from the cut cakes and for cleaning the board.

The lifter or shovel end 23 is preferably attached to the handle 13 in the following manner: The wire is folded at 24 and thereby forms the two legs 14 and 15. The return bend 24 is preferably flattened for convenience in slipping under the dough. A stem portion 25 is provided which extends up the gradually spreading legs 14 and 15 and is clasped around each of the legs 14 and 15, as shown at 26, and a flat headed rivet 27 is inserted through the fold 24 and the sheet metal plate of the lifter 23 thereby holds the same firmly in position and strengthens all the parts.

We claim as new:—

1. In a device of the type set forth, a flat plate formed to lift dough at one end thereof, an integral stem extending outwardly from the opposite end of the plate, a handle having spaced parts which seat on the stem and extend across the line of juncture between the stem and plate and seat on the latter, and means to secure the inner end of the handle to the plate, the opposite sides of the stem being bent inwardly to grip said respective spaced parts of the handle.

2. In a device of the type set forth, a substantially U-shaped wire handle, a plate having a stem extending outwardly from an end thereof, said handle being engaged with said plate at the base of the U and having its legs engaged with said stem, the opposite sides of the stem being bent inwardly to inclose the adjacent parts of the legs of the handle, and a rivet engaging the base and legs of the handle to secure the handle to the plate.

In testimony whereof we have affixed our signatures in the presence of two witnesses.

JOHN SATTERQUIST.
NELS CONRAD NELSON.

Witnesses:
H. A. SANDBERG,
J. E. NORDSTROM.